United States Patent
Orenstien et al.

(10) Patent No.: US 7,096,145 B2
(45) Date of Patent: Aug. 22, 2006

(54) DETERMINISTIC POWER-ESTIMATION FOR THERMAL CONTROL

(75) Inventors: Doron Orenstien, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/038,162

(22) Filed: Jan. 2, 2002

(65) Prior Publication Data

US 2003/0125900 A1    Jul. 3, 2003

(51) Int. Cl.
*G06F 15/00*    (2006.01)

(52) U.S. Cl. .................................... 702/132

(58) Field of Classification Search .............. 701/29, 701/50, 115, 102, 213, 220; 713/300, 320, 713/310, 321, 502, 131; 320/128, 106; 318/10, 318/376; 702/132; 703/18, 20; 477/174; 123/305, 682, 443, 336; 455/433, 445; 180/197; 340/457, 442, 540; 388/811; 257/706; 374/178, 374/141; 219/510, 506, 501; 126/21; 417/45; 700/291, 295; 323/283; 709/203; 324/142
See application file for complete search history.

(56) References Cited

U.S. PATENT DOCUMENTS 5,287,292 A * 2/1994 Kenny et al. ............... 702/132

| | | | |
|---|---|---|---|
| 5,719,800 A * | 2/1998 | Mittal et al. ................ | 713/321 |
| 5,781,783 A | 7/1998 | Gunther et al. | |
| 6,192,479 B1 | 2/2001 | Ko | |
| 6,443,123 B1 * | 9/2002 | Aoki et al. ................. | 123/305 |
| 6,564,328 B1 * | 5/2003 | Grochowski et al. ....... | 713/320 |
| 6,789,037 B1 * | 9/2004 | Gunther et al. ............. | 702/132 |
| 2002/0073348 A1 * | 6/2002 | Tani .......................... | 713/300 |
| 2003/0065960 A1 * | 4/2003 | Rusu et al. ................. | 713/300 |

FOREIGN PATENT DOCUMENTS

EP    0 549 165 A2    6/1993
WO    WO 99/17186    4/1999

OTHER PUBLICATIONS

PCT Search Report for co-pending PCT application No. PCT/US02/41439 mailed Sep. 15, 2003.

* cited by examiner

*Primary Examiner*—Michael Nghiem
*Assistant Examiner*—Tung S. Lau
(74) *Attorney, Agent, or Firm*—Blakely, Sokoloff, Taylor & Zafman LLP

(57) ABSTRACT

A system is described that includes a microprocessor and a thermal control subsystem. The microprocessor includes execution resources to support processing of instructions and consumes power. The microprocessor also includes at least one throttling mechanism to reduce the amount of heat generated by the microprocessor. The thermal control subsystem is configured to estimate an amount of power used by the microprocessor and to control the throttling mechanism based on the estimated amount of current power usage to ensure that junction temperature will not exceed the maximum allowed temperature.

19 Claims, 3 Drawing Sheets

DETERMINISTIC POWER-ESTIMATION FOR THERMAL CONTROL

BACKGROUND

1. Field of the Invention

This invention relates to thermal control for microprocessors.

2. Description of the Related Art

With the increasing complexity of new microprocessors, thermal control becomes more challenging. Current microprocessors include extensive execution resources to support concurrent processing of multiple instructions. A drawback to providing a microprocessor with extensive execution resources is that significant amounts of power are required to run the microprocessors. Different execution units may consume more or less power, depending on their size and the functions they implement, but the net effect of packing so much logic onto a relatively small process chip is to create the potential for significant power dissipation problems.

In conventional thermal control systems, junction temperature (Tj) on a die is observed to ensure that it does not exceed an allowed maximum value to avoid reliability issues. When the junction temperature approaches the allowed maximum value, throttling may be activated to cool the microprocessor, resulting in a significant performance loss.

Detection of a maximum junction temperature violation may be accomplished by measuring the temperature of an area of a die close to the known hot spots. Some microprocessors use a thermal diode on the microprocessor die for temperature tracking. Temperature tracking can be used to activate some sort of throttling when the temperature level exceeds the maximum allowed value, or can be used to increase the microprocessor performance level (e.g., increase voltage/frequency) when the temperature level is low. It has been found that the current passing through the thermal diode is a function of temperature. Accordingly, a circuitry is provided, in at least some of the conventional thermal control systems, which is adapted to detect the amount of current passing through the thermal diode and to trigger throttling whenever the temperature on the die exceeds the allowed maximum value.

Currently used thermal diodes protect microprocessors from overheating situations, but may not be useful in mobile systems. In general, original equipment manufacturers (OEMs) of mobile systems prefer not to support thermal diode based throttling in normal operating conditions while running typical applications. Thermal diode throttling introduces non-deterministic behavior to mobile systems, something an OEM prefers to avoid. OEMs operate on the assumption that systems of the same type and having the same chip version behave similarly and provide the same benchmark score. Thermal diode based throttling creates a non-deterministic behavior since each chip has a different thermal response, leakage current, etc.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION

In the following description, specific details are set forth in order to provide a thorough understanding of the present invention. However, it will be apparent to one skilled in the art that the present invention may be practiced without these specific details. In other instances, well-known circuits, structures and techniques have not been shown in detail in order to avoid obscuring the present invention.

A thermal control system is described. In one embodiment, a thermal control system is provided that uses a digital power monitoring for thermal control in computer systems. The digital monitoring of power is configured to estimate an amount of power used by a microprocessor. Based on the estimated power usage, the thermal control system controls the activation and deactivation of throttling mechanism to avoid unsafe junction temperature that may cause system degradation or that exceeds system specification.

It has been found than the amount of power consumed by a microprocessor during a time interval is related to junction temperature (Tj) on the die of the microprocessor. In other words, when the microprocessor within a computer system consumes relatively a large amount of power for a period of time, this may indicate that the microprocessor is operating at relatively high temperature. Accordingly, when the estimated power usage is relatively high, the thermal control system may activate one or more of its thermal throttling mechanism to enable the microprocessor to cool itself. Additionally, when the estimated power usage is quite low, the thermal control system may be configured to increase the microprocessor performance, for example, by increasing operating voltage level, increasing clock frequency, or enabling additional activities.

According to one embodiment, the thermal control system dynamically estimates an average power consumed by a microprocessor during a given time interval by periodically executing software codes (e.g., micro-code, system management mode (SMM) software, or the like) in the microprocessor. In one embodiment, the power consumption level is estimated based on the frequency of various activities occurring within the microprocessor. Unlike the thermal-diode based temperature estimation, the power estimation carried out by software has deterministic behavior (per a given system and a given set of applications), resulting in a deterministic system behavior. In contrast, currently used thermal diodes do not provide deterministic power estimation for thermal control.

Figure 1:
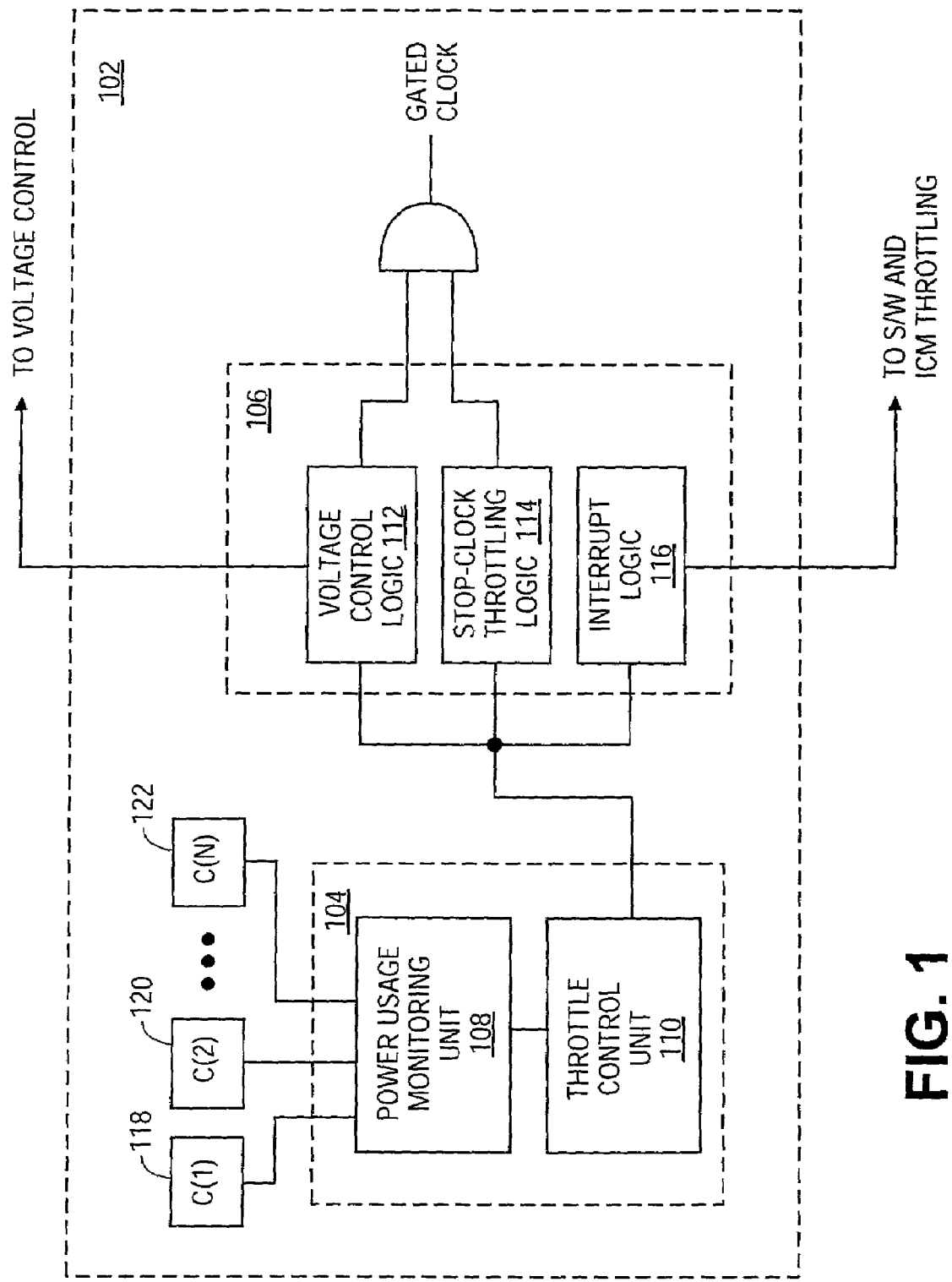
FIG. 1 shows a block diagram of a thermal control system according to one embodiment of the invention.

FIG. 1 depicts a thermal control system 104 according to one embodiment of the invention. The thermal control system 104 is incorporated in a microprocessor 102 having, among other things, a semiconductor die including at least one throttling mechanism 106. In the illustrated embodiment, three types of throttling mechanisms are shown, which include stop-clock throttling logic 114, a voltage control logic 112, and an interrupt logic 116. When the thermal control system 104 detects that the power consumed by the microprocessor 102 exceeds the maximum allowed power, one or more of the throttling mechanisms 106 may be invoked to ensure that die temperature will not exceed thermal design limits during operation. For example, the stop-clock throttling logic 114, which when activated, momentarily reduces or stops the clock of the microprocessor for example, for few microseconds. The die temperature can also be reduced by lowering the operating voltage level, which is controlled by the thermal control system 104 via the voltage control logic 112. Toggling of any one of the throttling mechanisms, including voltage control logic 112, stop-clock throttling logic 114 and interrupt logic 116, may significantly reduce the amount of heat generated by the microprocessor in a relatively short period of time.

The throttling mechanisms 106 presented in FIG. 1 are for illustrative purposes only, and those of ordinary skill in the art will understand that, in practice, the thermal control system 104 may employ other types of throttling mechanisms. Accordingly, it should be understood that the thermal control system described herein is generally applicable to all types of microprocessors, irrespective of the specific throttling mechanisms employed.

The illustrated thermal control system 104 includes a power usage monitoring unit 108 and a throttle control unit 110. In one embodiment, the power usage monitoring unit 104 is embodied in the form of software code such as micro-code executed periodically within the microprocessor to estimate power consumption based on the number of occurrences of various activities performed in the microprocessor. Based on the estimated power usage provided by the power usage monitoring unit 104, the throttle control unit 110 generates and sends signals to the one or more of the throttling mechanisms 106 to cool the microprocessor if cooling is necessary to avoid unsafe die temperature that may cause system degradation.

In general, there are a number of functional units within a microprocessor, each of which consumes different amount of power. Accordingly, by counting the number of times certain functional units are activated during a defined time period, the amount of power consumed by the microprocessor during that time period may be estimated. To count the number of occurrences of certain activities, the power usage monitoring unit 104 communicates with a set of counters 118–122 incorporated in the microprocessor. The counters 118–122 may be implemented as registers in hardware components and variables in software codes and are used to count the number of occurrences of a particular activity.

For example, one counter monitored by the power usage monitoring unit 108 may be configured to count the number of floating point operations performed by the microprocessor during a sampling time period. Another counter may be configured to count the number of cache memory accesses occurring in the microprocessor, data from which may be used to estimate the amount of power consumed by the microprocessor. The number of instructions decoded by the decoder may also be another activity monitored by the power usage monitoring unit 104 via some sort of counter mechanism. It should be understood that the present invention may be implemented by monitoring any other suitable activities occurring within the microprocessor and is limited to examples specified herein.

In accordance with one embodiment, the thermal control utilizes a combination of software and hardware, as opposed to currently used hardware circuitry in combination with a thermal diode. Accordingly, by using both hardware and software to estimate power usage, additional flexibility is provided, enabling the thermal control system to factor in various parameters such as the operating voltage level and clock frequency into the power estimation. By using software code to estimate power usage, rather than using pure logic or hardware circuitry, the maximum junction temperature violation can be detected with sufficient accuracy for activating throttling with minimal system-level tuning by Basic Input/Output System (BIOS).

Figure 2:
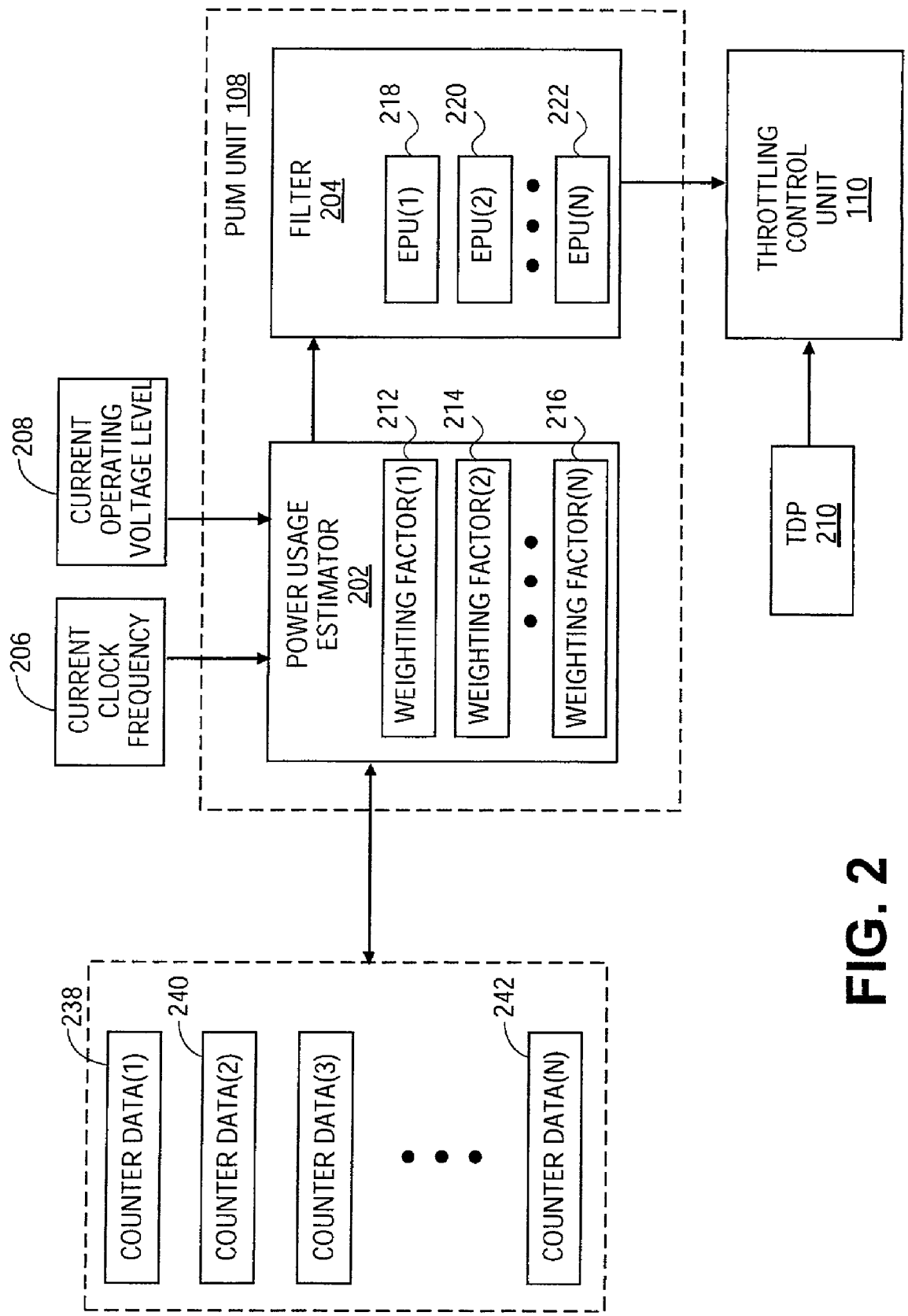
FIG. 2 shows a block diagram of a power usage monitoring unit according to one embodiment of the invention.

FIG. 2 depicts a block diagram of a power usage monitoring (PUM) unit 108 according to one embodiment of the invention. The PUM unit 108 includes power usage estimator 202 to estimate power usage based on counter data and a filter 204 to provide an average power usage value of estimated power usage (EPU) values 218–222 obtained during the current and past sampling periods.

As noted above, to estimate the power consumed by the microprocessor, the power usage estimator 202 periodically obtains counter data 238–242 from various counters incorporated in the microprocessor. In one embodiment, the power usage is estimated every few microseconds since thermal response may be relatively slow (e.g., in the rage of tens of microseconds). In this regard, at the beginning of each sampling period, the power usage estimator 202 will first access the counter data from each counter and then will reset the counters once the count data has been read. Once the counter data has been obtained, the power usage estimator 202 applies a respective weighted factor 212–216 to each of the counter data 238–242 and combines the weighted counter data to provide a weighted sum of the counter data.

It has been found that the amount of power consumed by the microprocessor is also influenced by the clock frequency and operating voltage level of the microprocessor. For example, if the microprocessor within a computer system is operating at higher frequency or higher voltage level, it will consume more power. In one embodiment, the weighted sum of the counter data is adjusted by the current clock frequency 206 and voltage level 208 to more accurately estimate the power usage. In one embodiment, the estimated power usage (EPU) 218–222 is computed as follows:

$$EPU=WSCD*V^2*F \quad (1)$$

where WSCD represented the weighted sum of the counter data, V represents current voltage level and F represents current clock frequency.

The current operating clock frequency 206 and voltage level 208 may be determined by examining registers in the BIOS that has been designated to store the current frequency and voltage level values. In at least some of the recently developed microprocessors, the voltage level and the operating frequency may change during runtime under various operating conditions. For example, the voltage level and the frequency could be adjusted by one of the throttling mechanisms. Alternatively, in mobile computer systems, the voltage level may change when a mobile computer system switches from an external power source mode to a battery power mode.

Once the estimated power usage (EPU) value has been computed, it is averaged with past EPU values 218–222 to filter out momentary peak power usage. Then, the average power usage value is compared with a maximum allowed power level (referred hereinafter as "TDP" 210). The value associated with TDP 210 may be programmed in one of the registers in BIOS and is useful in determining when the junction temperature of the microprocessor may violate the maximum allowed temperature based on the estimated power usage. The TDP value 210 may be determined by executing benchmark program and determining how much power can be consumed by the microprocessor before it exceeds the maximum allowed temperature under normal or worst-case scenario. If the current power usage exceeds the TDP value 210 for a period of time, the junction temperature of microprocessor will start to exceed the maximum allowed temperature. Therefore, to reduce the junction temperature under such condition, the throttling control unit 110 will activate one or more of the throttling mechanism when the average power usage exceeds the TDP value.

It has been found that the relationship between the power consumption (power) and the junction temperature (Tj) may be expressed as follows:

$$Tj = Ta + Tsys + Rjc * \text{power} \qquad (2)$$

where Ta represents ambient temperature around the microprocessor; Tsys represents motherboard contribution to heat; and Rjc represents thermal resistance.

The values associated with Ta, Tsys and Rjc are system dependent and are typically unknown. For example, the value associated with the thermal resistance (Rjc) of a system is difficult to obtain since it depends on a number of factors such as the cooling capacity of its fan and heat sink, and the like. Accordingly, in one embodiment, the thermal control system does not calculate the junction temperature directly. Instead, the estimated power is compared to a fixed reference point (e.g., TDP). By doing so, thermal control can be provided without having to compute parameters such as Ta, Tsys and Rjc.

Figure 3:
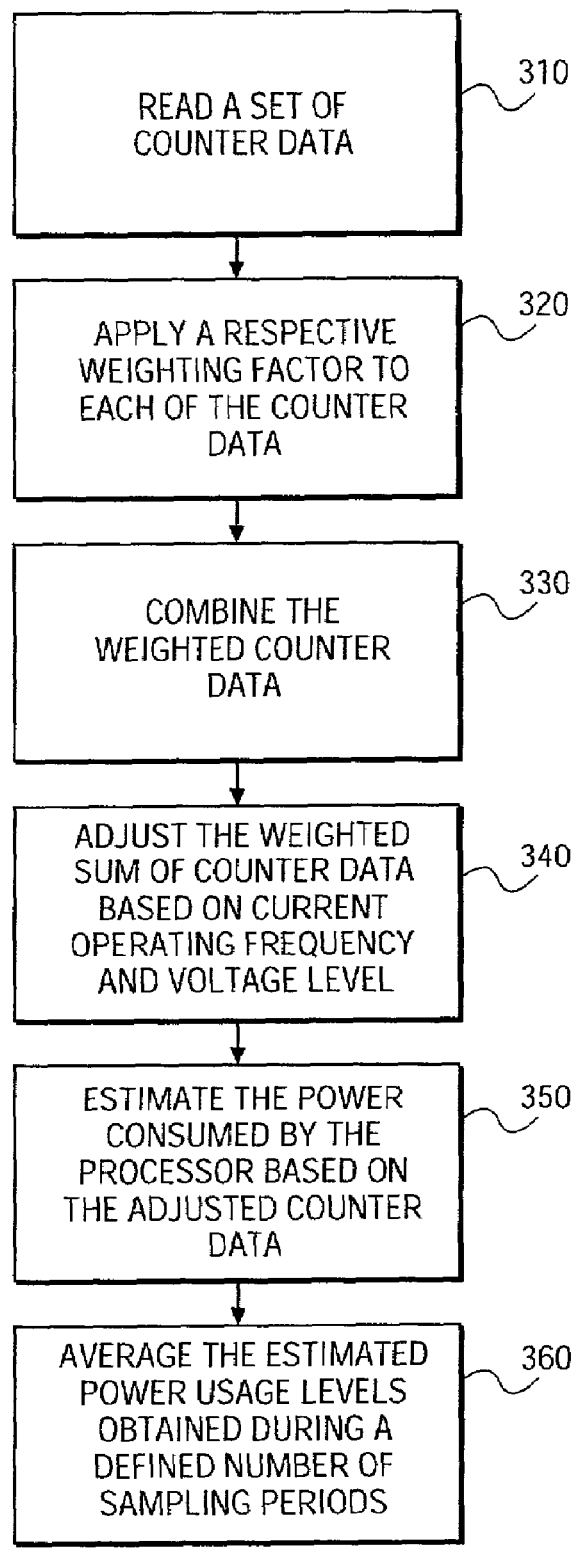
FIG. 3 shows a flow diagram of estimating power usage by a microprocessor according to one embodiment of the invention.

FIG. 3 depicts operations of estimating power usage according to one embodiment of the invention. In one implementation, the software code running in the microprocessor estimates the current power usage level based on an assumption that the current power usage is proportional to a set of counter data adjusted by a corresponding weighting factor associated with each individual counter data. The estimated power usage (PU) may be expressed as follows:

$$EPU = (\text{weighting factor}(i) * \text{counter data}(i)) + \text{idle power} \qquad (3)$$

where weighting factor(i) represents a coefficient value associated with its corresponding counter data used to adjust the counter data collected during a sampling period and idle power represents a constant value corresponding to an amount of power consumed by the microprocessor when it is not executing instructions (e.g., clocking power, static current power, leakage power).

Referring to FIG. 3, a set of counter data is read from counters in block 310. In one embodiment, the set of counter data relates to certain high level activities which may be counted by counters incorporated in the microprocessor. For example, the counter data may be collected from the existing performance monitor counters or other counters incorporated into the microprocessor for the purpose of monitoring power usage. If existing performance monitor counters are used, the performance monitoring logic or software program may be used to track the level of activities associated with the corresponding counters.

Then, in block 320, a respective weighting factor is applied to each of the counter data. For example, in one implementation, the weighted counter data is obtained by multiplying each individual counter data with the corresponding weighting factor. When the thermal system is being designed, a respective weight factor is assigned to each counter data to represent the level of power usage associated with the functional unit corresponding to the counter data. Each weighting factor may be derived by microprocessor IC designers using some sort of power estimation tools (e.g., Architectural Level Power Simulator (ALPS)). Once weighted counter data has been computed, an accumulated counter value is obtained by combining the weighted counter data together in block 330.

The power consumed by the microprocessor will depend on a number of factors, including operating clock frequency, voltage level applied to the microprocessor, which values may change during runtime. In order to take such factors into consideration, the accumulated counter value is adjusted based on the current operating frequency and voltage level in block 340. For example, the accumulated counter value may be adjusted by a multiplied factor of the current operating frequency and voltage level.

In block 350, the amount of power consumed by the microprocessor is estimated based on the adjusted counter data. Then, to avoid responding to momentary change in estimated power consumption (e.g., peak power usage), past history of power usage is factored into consideration. In this regard, the estimated power usage levels obtained during past certain number of sampling periods are averaged in block 360. One way of doing this is to maintain a sliding window with a defined number of past power estimations and use weighted sum to estimate the average power usage.

Once the average power usage has been estimated, it may be compared with a defined threshold value. In one embodiment, the estimated average power usage is compared against a maximum allow power usage value (TDP). Based on the ratio between the estimated power usage and TDP, the frequency, the operating voltage level and performance of a microprocessor may be adjusted up or down. For example, when this ratio approaches one, light throttling is initiated.

One problem associated with the conventional microprocessors using thermal diodes is that they do not provide deterministic results from one system to another system. For example, because the temperature of the die is measured using thermal diodes, various factors may affect the temperature measurement and the performance of the system. In addition, each microprocessor is fabricated with slightly different parameters such as static power level, temperature responses, etc. and slightly different behavior such as heat sink capability, quality, etc. As a result, the performance of different microprocessors measured using the same benchmark program under similar condition will provide different performance results. Because the timing of when throttling is activated is different from one microprocessor to another, the behavior of each microprocessor will be non-deterministic, resulting in one microprocessor performing better than another microprocessor. To avoid high junction temperature for all microprocessors, a higher margin value may need to be assigned so that throttling can be timely activated in less sensitive microprocessors, which results in a loss of performance. Another problem associated with non-deterministic behavior is the added complexity in validation and system debugging, typically performed by OEM and IT managers of large companies purchasing a large amount of portable computer systems, such as notebooks.

In contrast, a microprocessor implementing the thermal control system according to one embodiment provides a deterministic behavior. This means that the performance of the microprocessor does not depend on chance but rather can be replicated one run after another. This means that when the same application program is executed on different motherboards, they will generate the same count value and have the same throttling behavior and performance. Advantageously, by using the same maximum allowed power usage value and weighting factor values, the scheme taught by the present invention enables the throttling mechanism to be activated in a deterministic manner.

In one embodiment, the thermal control system is implemented in a portable computer system such as notebook computers to provide deterministic throttling behavior. It has been found that deterministic behavior is particularly desirable in portable computer systems. In one embodiment, the digital power monitoring capability of the thermal control system is used to improve performance of portable computer systems by using the thermal control system to detect situations when the microprocessor is operating at low temperature and when the microprocessor temperature is approaching maximum value. By doing so, the performance level may be increased in low temperature situations by increasing operating frequency and voltage level. Further, light throttling may be enabled when the microprocessor temperature is approaching a maximum value. By using light throttling, the maximum allowed temperature may be avoided without use of full throttling.

The operations performed by the present invention may be embodied in the form of software program stored on any type of machine-readable medium capable of storing or encoding a sequence of instructions for execution by a machine. The term "machine-readable medium" shall be taken to include, but not limited to, solid-state memories, magnetic and optical memories and carrier wave signals. Moreover, the present invention is not described with reference to any particular programming language. It will be appreciated that a variety of programming languages may be used to implement the teachings of the invention as described herein.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. An apparatus comprising:
   a first counter to count a number of times a first functional unit of the apparatus is activated;
   a processing unit to apply a mathematical function to yield a deterministic estimate of an overall power consumption, the mathematical function to accept inputs including a value from the first counter the mathematical function linear relation to the count.

2. The apparatus of claim 1, wherein
   a first weighting factor is associated with the first counter;
   a second counter having a second weighting factor is provided, the second counter to count a number of times a second functional unit of the apparatus is activated; and
   the mathematical function accepts as additional inputs the first weighting factor, the second weighting factor and a value from the second counter.

3. The apparatus of claim 1, the mathematical function to accept as additional inputs an operating voltage level of the apparatus and a current clock frequency of the apparatus.

4. The apparatus of claim 1, further comprising:
   at least one throttle to alter the overall power consumption of the apparatus, wherein
   the at least one throttle is activated if the deterministic estimate of an overall power consumption exceeds a first threshold power level, and
   the at least one throttle is deactivated if the deterministic estimate of an overall power consumption falls below a second threshold power level.

5. The apparatus of claim 4 wherein the first threshold power level and the second threshold power level are the same.

6. The apparatus of claim 1 wherein the first functional unit is one of a floating point unit, a cache unit, and an instruction decoding unit.

7. The apparatus of claim 1 wherein the mathematical function accepts as an additional input at least one previous deterministic power consumption estimate.

8. A method comprising:
   counting a number of times a first functional unit of an integrated circuit is activated and
   applying a mathematical function to generate a deterministic estimate of an overall power utilization of the integrated circuit, the mathematical function accepting as an input the number of times the first functional unit was activated, the mathematical function linear relation to the number of times the first function unit was activated.

9. The method of claim 8, further comprising:
   adjusting the number of times the first function unit was activated by a first scaling factor;
   counting a number of times a second functional unit of an integrated circuit is activated;
   adjusting the number of times the second functional unit was activated by a second scaling factor; and
   supplying the adjusted number of times the second functional unit was activated as an additional input to the mathematical function.

10. The method of claim 8, further comprising:
    supplying an operating voltage level and a current clock frequency of the integrated circuit as additional inputs to the mathematical function.

11. The method of claim 8, further comprising:
    reducing the operating voltage level of the integrated circuit if the estimate of the overall power utilization exceeds a first threshold, and
    increasing the operating voltage level of the integrated circuit if the estimate of the overall power utilization falls below a second threshold.

12. The method of claim 8, further comprising:
    reducing the clock frequency of the integrated circuit if the estimate of the overall power utilization exceeds a first threshold, and
    increasing the clock frequency of the integrated circuit if the estimate of the overall power utilization falls below a second threshold.

13. The method of claim 8 wherein the first functional unit is one of a floating point unit, a cache unit, and an instruction decoding unit.

14. A machine-readable medium containing instructions that, when executed by a machine, cause the machine to perform operations comprising:
    counting a number of times a first functional unit of the machine is activated, and
    applying a mathematical function to generate a deterministic estimate of an overall power utilization of the machine, the mathematical function accepting as an input the number of times the first functional unit was activated, the mathematical function linear relation to the number of times the first function unit was activated.

15. The machine-readable medium of claim 14 containing instructions that, when executed by the machine, cause the machine to perform additional operations comprising:
    adjusting the number of times the first function unit was activated by a first scaling factor;
    counting a number of times a second functional unit of the machine is activated;

adjusting the number of times the second functional unit of the machine was activated by a second weighting factor; and incorporating the adjusted number of times the second functional unit was activated into the estimate of the overall power utilization.

16. The machine-readable medium of claim 14 containing instructions that, when executed by the machine, cause the machine to perform additional operations comprising incorporating an operating voltage level of the machine and a current clock frequency of the machine into the estimate of the overall power utilization.

17. The machine-readable medium of claim 14 containing instructions that, when executed by the machine, cause the machine to perform additional operations comprising averaging the estimated power utilization with at least one previously-generated estimated power utilization.

18. The machine-readable medium of claim 14 containing instructions that, when executed by the machine, cause the machine to perform additional operations comprising:

reducing an operating voltage level of the machine if the estimated overall power utilization is above a first threshold; and increasing the operating voltage level of the machine if the estimated overall power utilization is below a second threshold.

19. The machine-readable medium of claim 14 containing instructions that, when executed by the machine, cause the machine to perform additional operations comprising:

reducing a clock frequency of the machine if the estimated overall power utilization is above a first threshold; and increasing the clock frequency of the machine if the estimated overall power utilization is below a second threshold.

* * * * *

UNITED STATES PATENT AND TRADEMARK OFFICE
CERTIFICATE OF CORRECTION

| | | |
|---|---|---|
| PATENT NO. | : 7,096,145 B2 | Page 1 of 1 |
| APPLICATION NO. | : 10/038162 | |
| DATED | : August 22, 2006 | |
| INVENTOR(S) | : Orenstien et al. | |

It is certified that error appears in the above-identified patent and that said Letters Patent is hereby corrected as shown below:

In column 7, at line 43, delete "relation" and insert --relative--.
In column 8, at line 14, delete "relation" and insert --relative--.
In column 8, at line 58, delete "relation" and insert --relative--.

Signed and Sealed this

Sixth Day of November, 2007

JON W. DUDAS
*Director of the United States Patent and Trademark Office*